INVENTORS
CHARLES ROBERT BROWNOLD
RICHARD JOSEPH KARAS
HENRY GERMANUS MAEDER, Jr.
BY Leonard R. Kohan
ATTORNEY

United States Patent Office 3,615,038
Patented Oct. 26, 1971

3,615,038
LAMINATED CONTAINER BODY
Charles Robert Brownold, Aurora, Richard Joseph Karas, Addison, and Henry Germanus Maeder, Jr., St. Charles, Ill., assignors to American Can Company, New York, N.Y.
Filed Apr. 21, 1970, Ser. No. 30,519
Int. Cl. B65d 25/14
U.S. Cl. 220—63 R
9 Claims

ABSTRACT OF THE DISCLOSURE

A container for packaging a food product such as ham or the like is made from a plastic laminate comprising two outer layers of high density polyethylene, two adjacent layers of low density polyethylene, and a central layer of saran.

BACKGROUND OF THE INVENTION

Heretofore, canned hams have been packed and sold in containers made of tin plate or other metals. While metal containers for hams are satisfactory, it would be desirable to provide a plastic container for packaging hams, thereby reducing the cost of the package and also the cost of shipping due to the lighter weight of plastic as compared to metal.

One of the problems which must be dealt with in packaging hams is to protect against contamination such as discoloring and flavor loss. Discoloration may be caused by excessive oxygen and by light. The oxidation process proceeds slowly in the dark, but light is a catalyst and the speed of reaction in the presence of oxygen is directly proportional to light intensity and quantity of oxygen. The discoloration may involve a change from pink or red to gray and brown shades caused by the oxidation of the pink colored nitric-oxide myochromogen which are produced during the meat curing process.

Accordingly, an object of the present invention is to provide a plastic container for packaging food products such as hams or the like which protects the food product from contaminating effects such as discoloration, flavor loss, and the like.

Another object of the present invention is to provide a plastic container for packaging food products such as ham and the like which is light in weight and which may be formed by known plastic forming techniques.

A further object is to provide a plastic container for packaging food products which is made from a plurality of layers of plastic material formed into a laminate, one of said layers being a barrier layer to protect the food product from contamination.

Another object is to provide a plastic container for packaging food products which is made from a laminate comprising a layer of saran included between layers of polyethylene.

Numerous other objects and advantages of the invention will be apparent as it is better understood from the following description, which, taken in connection with the accompanying drawing, discloses a preferred embodiment thereof.

SUMMARY OF THE INVENTION

A container for packaging a food product is made from a plastic laminate comprising two outer layers of high density polyethylene, two adjacent layers of low density polyethylene and a central layer of saran. Although not limited thereto, the container is adaptable for packaging hams and to protect the latter against contamination such as discoloration and flavor loss.

BRIEF DESCRIPTION OF THE DRAWING

FG. 1 is a perspective view of a container constructed according to one embodiment of the invention.

DESCRIPTION OF THE PREFERRED EMBODIMENT

Figure 1:
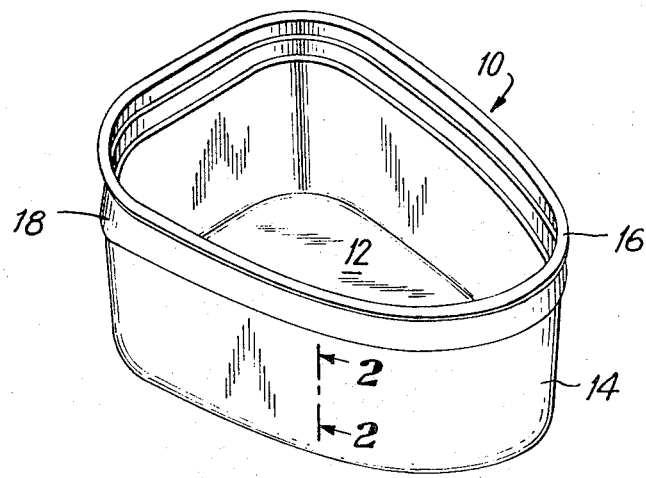

Referring to the drawings, FIG. 1 shows a container 10 suitable for holding a food product such as ham. The container comprises a base 12 and a circumscribing side wall 14, the latter having a peripheral flange 16 adapted to be doubleseamed to a lid or cover (not shown) in a conventional manner. As deemed desirable, the container may be provided with a circumscribing shoulder 18 in the side wall 14 to facilitate nesting of a plurality of like containers.

The container 10 is made from a plastic laminate 11 (FIG. 2), initially by providing a flat sheet of the plastic laminate 11 and thereafter subjecting the sheet to a thermoforming operation consisting of heating the sheet and forcing or pulling it down onto a mold surface. The plastic laminate 11 in the illustrated embodiment comprises five layers of plastic in which the two outer layers 20, 22 are high density polyethylene, the next two inner layers 24, 26 are low density polyethylene, and the central layer 28 is saran which is a copolymer of vinylidene chloride and vinyl-chloride. The purpose of the saran is to act as a barrier to protect the food product against flavor loss, contamination, or other deleterious effects. In the case of ham, the saran acts as a barrier to protect against, among other things, discoloration, contamination, flavor loss and oxidation. To this end saran film has low gas and water transmission rates and its optical qualities are such that although it transmits 90% of the visible light, it has a high ultraviolet cut-off which serves to protect food products, especially meats.

It has been found that the saran-polyethylene laminate 11 affords sufficient protection against light and oxygen for at least twelve months shelf life or pasteurized ham. One sample container made from the saran-polyethylene laminate 11 was held under dark storage for three months and then stored under light for nine months. No difference in taste or odor was detected between such sample and other saran-polyethylene sample containers held totally under the light or totally in the dark or between such sample and a container made of tin plate.

Figure 2:
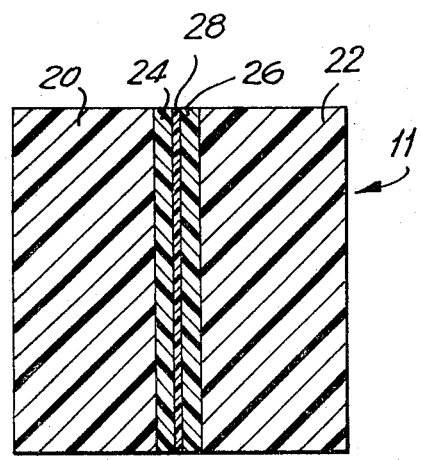
FIG. 2 is a partial sectional view on an enlarged scale taken along the line 2—2 of FIG. 1.

In one test, seven sealed containers containing ham were stored for twelve months. One of the containers was made of tin plate and used as a control. The other six containers were made from a plastic lamination which included saran and polyethylene as shown in FIG. 2. Two of the plastic containers were stored under fluorescent light for the full twelve months with the bottom plastic end up; one was stored under the same conditions except the metal lid end was up; one was stored in the dark for three months followed by storage in the light for nine months with the plastic bottom end up; and two were stored in the dark for the complete twelve month period.

All of the plastic-packed variables were comparable to the tinplate control in odor and taste. During the tasting portion of the test, the tinplate control had a somewhat flat taste and the plastic-packed hams retained a normal ham taste. Sample No. 2 which had a light discolored portion at the nose area, exhibited the typical off-taste when sampled at this point; however, the remainder of the ham maintained an excellent flavor. All samples showed the previously observed small brown stain at the establishment number, where the enamel had been cracked. The tinplate control had lost its sacrificial aluminum anode due to corrosion at the weld.

Sample No. 2 showed a light decolorized patch at the nose corresponding to a void area. Plastic from this spot was sectioned and examined under a metallographic microscope. It was determined that the saran barrier had ruptured during manufacture at a point corresponding directly with a void in the meat which formed during packing and doubleseaming.

In another test, three pound hams were vacuum sealed in containers made from a saran-polyethylene laminate 11 with a doubleseamed standard tinplate end. Six such containers were stored for 16 months. Two plastic containers, of six opened, failed to completely protect the ham from the graying effect of light exposure and oxidation. Subsequent investigation showed that in one case, a gap existed in the saran barrier at a point corresponding to a void area in the meat. The void was formed during packing and double seaming. In the second case, general light decolorizing was apparent over most of the light-exposed surface. It was found that the saran-polyetheylene laminate used in this test afforded sufficient protection against oxygen for at least 16 months' shelf life of pasteurized ham. The saran-polyethylene laminate used in the test afforded sufficient protection against light and oxygen for at least 12 months' shelf life of pasteurized ham under continuous exposure to strong light. One plastic sample of those opened had been held under dark storage for 3 months and then stored under light for 13 months. No difference in taste or odor was detected between this sample and those held totally under light or totally in the dark, or the tinplate control. Two plastic samples of those opened had been under dark storage for 16 months. These samples appeared comparable to the control in texture, color and flavor.

By way of example, a container for a three pound ham may be made from a laminate in which the two outer layers 20, 22 of high density polyethylene have a thickness of 0.036 inch each, the two inner layers 24, 26 of low density polyethylene have a thickness of 0.00125 inch each, and the central layer of saran has a thickness of 0.0005 inch. The thicknesses of the various laminates may be varied as desired. For example, for larger containers, the thickness of the high density polyethylene 20, 22 may be increased to provide the required added container strength. The layers of low density polyethylene 24, 26 may vary as required for example between 0.0005 and 0.002 inch. In this regard it will be noted that the low density polyethylene serves to facilitate lamination between the saran and the high density polyethylene. The thickness of the saran film 28 may also vary, for example between 0.001 and 0.00025 inch. In this regard, saran is relatively expensive and it is desirable to use a minimum thickness which will provide the desired barrier properties.

A particular laminate comprising the layer of saran 28 and the two layers of low density polyethylene 24, 26 may be used for various sizes of containers because the function of the saran as a barrier and the function of the low density polyethylene to facilitate lamination of the high density polyethylene does not depend on the size of the package. A laminate comprising a layer of saran sandwiched between two layers of low density polyethylene is commercially available under the trademark Saranex and sold by Dow Chemical Co.

The plastic laminate container of the present invention is suitable for use in packaging processed pasteurized hams of the type which are kept refrigerated at all times. In processing and packaging such hams, the ham is sealed in the container by effecting a doubleseam seal between the container flange 16 and a suitable metal end closure (not shown). Thereafter, the sealed container is heated, for example, by placing it in water agitated by air bubbles, in which the water temperature is approximately within the range of from 155 to 170 deg. F. In processing the ham, the center of the ham should reach a temperature of approximately 150 deg. F. Thus, the processing will require varying lengths of time depending on the size of the ham. For example, a three pound ham packaged in a container made of laminate 11 may be required to be maintained in the heated water for one hour.

It will be appreciated therefore, that the ham container must be capable of withstanding exposure to the aforesaid processing steps. The high density polyethylene has properties such that it will not be adversely affected upon being subjected to the aforesaid temperature conditions. Although low density polyethylene by itself may be adversely affected upon exposure to the aforesaid conditions, the outer layers of high density polyethylene will protect the low density polyethylene. Saran will not be affected in that it is resistant to intermittent dry heat at temperatures up to 200 deg. F. and exhibits excellent resistance to moist heat at temperatures as high as 270 deg. F.

It is thought that the invention and many of its attendant advantages will be understood from the foregoing description and it will be apparent that various changes may be made in the form, construction and arrangement of the various parts without departing from the spirit and scope of the invention or sacrificing all of its material advantages, the form hereinbefore described being merely a preferred embodiment thereof.

What is claimed is:

1. A container for packaging food products, said container being made from a plastic laminate comprising two outer layers of high density polyethylene, two adjacent layers of low density polyethylene, and a central layer of saran.

2. A container according to claim 1 in which said saran has a thickness within the range of 0.001 to 0.00025 inch.

3. A container according to claim 1 in which said saran has a thickness of approximately 0.0005 inch.

4. A container according to claim 1 wherein the low density polyethylene has a thickness within the range of from 0.0005 to 0.002 inch.

5. A container according to claim 1 wherein the low density polyethylene has a thickness of approximately 0.00125 inch.

6. A container according to claim 1 wherein said container is adapted to store pasteurized ham and protect the latter against discoloration and other contamination.

7. A container according to claim 1 in which the container is formed from a sheet of said laminate by a thermoforming operation.

8. A container according to claim 1 in which the container has an open top, and a flange about the periphery of the open top adapted to receive metal closure end.

9. A container according to claim 1 in which the container is capable of withstanding exposure to a wet temperature of at least 170 deg. F. for at least one hour.

References Cited
UNITED STATES PATENTS

| | | | |
|---|---|---|---|
| 2,956,723 | 10/1960 | Tritsch | 229—3.5 X |
| 3,070,817 | 1/1963 | Kohrn et al. | 220—83 UX |
| 3,274,004 | 9/1966 | Curler et al. | 229—3.5 X |
| 3,298,559 | 1/1967 | Lurie | 220—63 |
| 3,387,640 | 6/1968 | Butler | 229—3.5 X |
| 3,454,210 | 7/1969 | Spiegel et al. | 229—3.5 X |

JOSEPH R. LECLAIR, Primary Examiner

J. R. GARRETT, Assistant Examiner

U.S. Cl. X.R.

161—124; 220—66, 83; 229—3.5 R